(12) United States Patent
Kuo

(10) Patent No.: US 7,198,405 B2
(45) Date of Patent: Apr. 3, 2007

(54) LINEAR GUIDE WAY WITH PARABOLIC PROFILED GROOVES

(75) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 180 days.

(21) Appl. No.: 11/117,534

(22) Filed: Apr. 29, 2005

(65) Prior Publication Data

US 2005/0259896 A1 Nov. 24, 2005

(30) Foreign Application Priority Data

May 19, 2004 (TW) ................................ 93114150 A

(51) Int. Cl.
*F16C 29/06* (2006.01)

(52) U.S. Cl. ........................................ 384/45; 384/516

(58) Field of Classification Search ................... 384/45, 384/43, 44, 49, 516

See application file for complete search history.

(56) References Cited

U.S. PATENT DOCUMENTS

| 6,010,420 A * | 1/2000 | Niki et al. .................. 384/475 |
| 2003/0059135 A1* | 3/2003 | Shirai et al. ................. 384/45 |

* cited by examiner

*Primary Examiner*—Lenard A. Footland
(74) *Attorney, Agent, or Firm*—Rosenberg, Klein & Lee

(57) ABSTRACT

An innovative parabolic profiled rolling grooves for linear guide way is disclosed. Cross sectional profile of at least one of the ray-way and the slider grooves is configured into a parabolic curve so as to avoid the balls to comprehensively contact the grooves and seriously increase the frictional loss. With the rolling grooves constructed as such, the mechanical durability and the loading ability can be definitely improved.

5 Claims, 6 Drawing Sheets

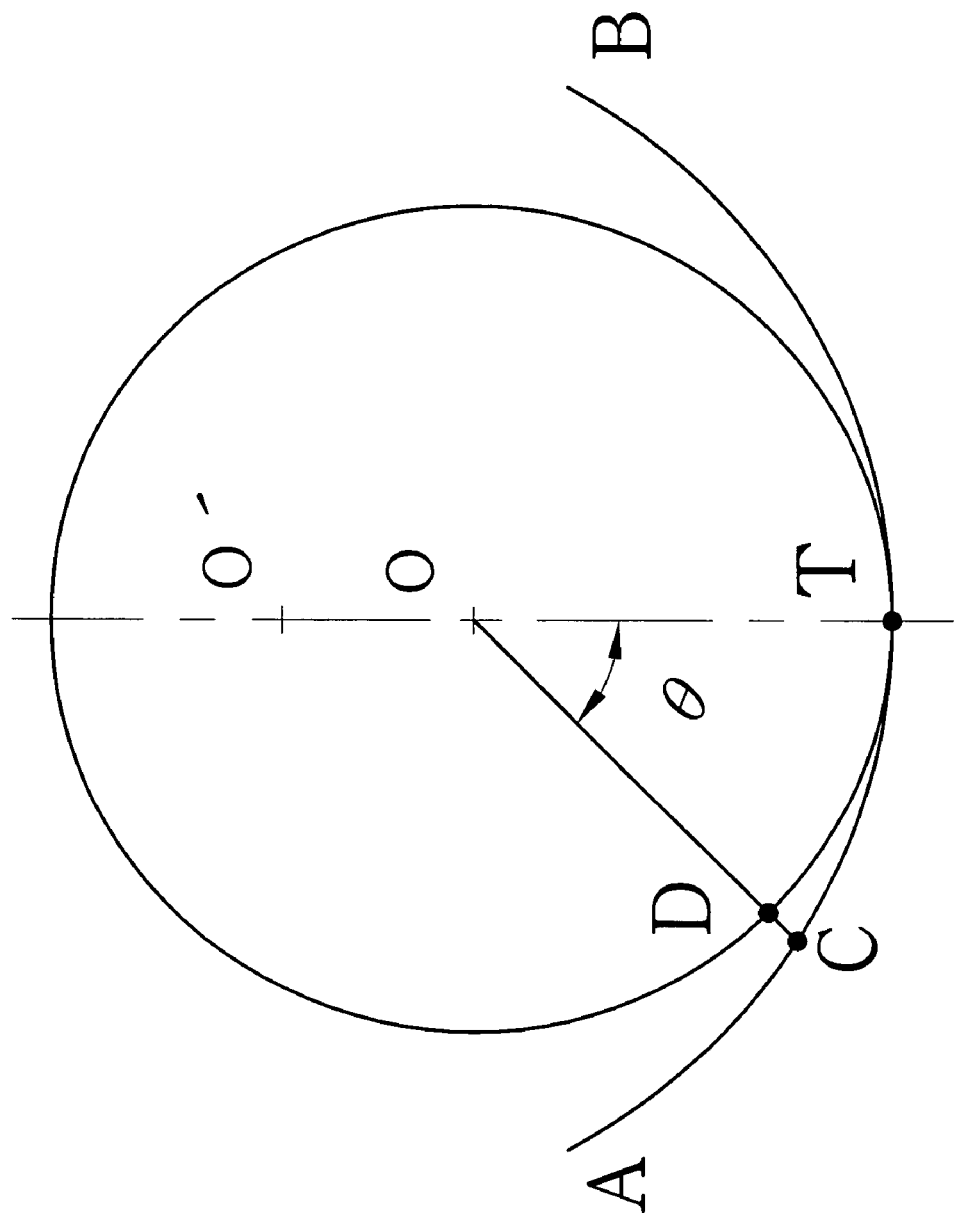

LINEAR GUIDE WAY WITH PARABOLIC PROFILED GROOVES

BACKGROUND OF THE INVENTION

1. Field of the Invention

The present invention relates to a linear guide way with parabolic profiled grooves, and more particularly, to a linear guide way whose cross sectional profiles of both railway and slider grooves are configured into a parabola so as to acquire an optimistic contact between balls and grooves.

2. Description of the Prior Art

A linear guide way is an important mechanism which has been widely employed as one of the mechanical components in the precision machines, the automation industry, the semiconductor industry, the medical application and the aerospace technology. The smooth motion of this mechanism relies on a plurality of balls rolling in the grooves of the guide way so as to reduce the frictional and heat losses arising on the contact surface of the slider and the rail way thereby speeding up the motion of the mechanism and, at the same time, improving its durability.

FIG. 6 is a perspective view of a conventional linear guide way. The linear guide way includes a rail way 1, a slider 2, and a plurality of balls. The rail-way 1 has a rail-way groove 11 provided in the lengthwise direction of the rail-way 1. The slider 2 provided with a slider groove 21 at the position corresponding to the rail-way groove 11, is set on the rail-way 1. The balls 3 are sandwiched between the rail-way groove 11 and the slider groove 21 to assist the slider 2 to travel along the lengthwise direction with their rolling motion in the two grooves 11 and 21. For convenience, the two grooves 11 and 21 will be collaborated in one to call the "rolling groove" hereinafter. Circulation holes 22 formed on the slider 2 provide a return passage for the balls 3 such that they are able to circulate by way of the rolling groove and the circulation holes 22.

FIG. 7 is a schematic view showing the cross section of a conventional rolling grove. As shown in FIG. 7, the pure arc AB is the cross section profile line of the rail-way groove 11 or the slider groove 21, wherein the point A and point B is the two end points of the arc AB. It can be clearly seen that the radius of arc AB is slightly larger than that of the circle O, which is the projection of the ball 3. The center of the arc AB is O', and point T is the contact point between the curve (arc) AB and the circle O. Line OT connects O and T. By connecting the center O and an arbitrary point C on the arc AB, the line OC intersects the circle O at point D forming angle θ between OC and OT, where the length of OD equals to the radius of circle O.

Here, define the radius of circle O as R, it is also the radius of the ball 3, and define the distance O'O as Δ, which is also the difference between the radius of arc AB and that of circle O, then O'C equals to the radius of arc AB, that is (Δ+R). Line CD represent the clearance formed between the ball 3 and the rolling groove. Here let us put CD=δ, according to the principle of geometry, θ,δ,R and Δ have the relation as $$\delta/R = \sqrt{(\Delta^2 \cos^2\theta + 2\Delta + 1)} - \Delta\cos\theta - 1.$$

Since factor δ/R is a nondimensional value which has nothing to do with the dimension of length. Besides, for convenience, define η=radius of arc AB/diameter of circle O, where η is called coefficient of figure. It is also dimensionless and can be expressed by the following formula:

$$\eta = (1+\Delta/R)/2$$

The relationship of various η with respect to the angle θ is expressed in the graphs of FIG. 8. As shown in FIG. 8, values of θ are expressed on the X axis while values of S/R are on the Y axis, where δ/R is a nondimensional ratio. Referring to the left curve of FIG. 8, where η=0.56, then S/R=$10^{-4}$, we get θ≈2.5° on the graph. If η=0.51, then δ/R=$10^{-4}$, we get θ≈6°. But when η<0.5, then values δ/R are all nil that means there is a full contact between arc AB and circle O.

According to the international standards, a significant permanent non-restorable (destructive) deformation is considered to happen to a ball when its deformation reaches the value $10^{-4}$ of its diameter. Of course, in the general case, the deformation of a ball is never allowed to approach the value $10^{-4}$ of its diameter. As shown in FIG. 8, assume η=0.56, when δ/R≦$10^{-4}$, θ≦2.5°, this is a very small value that means the region of permissible load for a ball is very strictly limited. In order to liberate this limit effectively, lowering the value of η is a feasible consideration. If η=0.53, θ can be enlarged to 3.4°; if η=0.52, θ is further enlarged to 4°; if η=0.51, θ reaches 6°. Form now on, if η is recklessly to 0.5 erroneously, δ/R becomes nil and the arc AB fully contacts the circle O which brings the ball to make a flat contact with the grooves resulting in a serious friction or even destructive abrasion therebetween.

Incidentally, an inevitable minor fabrication error results in a slight deviation in sizes of ball, or arc radius of rolling groove. A larger η causes degrading the loading ability of the linear guide way, on the other hand, if η approaches 0.5, an undesirable danger of severe abrasion to the mechanism of the linear guide way is likely to happen.

In order to avoid falling into such a dilemmatic state when fabricating a linear guide way, a practical improvement in designing a rolling groove having an optimistic profile to eliminate the inherent disadvantages described above is definitely necessary.

SUMMARY OF THE INVENTION

Accordingly, it is an object of the present invention to provide a linear guide way whose rolling grooves can prevent a comprehensive contact with the balls to bring about a severe damage to the mechanism of the linear guide way by excessive friction, but instead, ensure the balls to roll along the groove smoothly with less frictional loss thereby increasing the loading ability to the linear guide way, and improving its working efficiency and prolonging its mechanical durability.

For achieving the aforesaid object, to design a proper cross section for the rolling groove is most important. The reason why the invention of the present invention strongly insists that the rolling groove whose cross section must be designed to have a curving profile in order to provide a more effective loading ability is based on the fact that the contact of a curve with a circle is in much better state than a linear contact. Then the present invention selects a binary curve to form a cross sectional profile for the rolling groove by reason that the binary curve is the simplest and easiest one of all the curves to deal with.

It is understood that the binary curves can be classified in three types according to their eccentricity. For eccentricity <1, the curve is an ellipse which is expressed in equation:

$$X^2/a^2 + Y^2/b^2 = 1, a > b > 0$$

For eccentricity >1, the curve is a hyperbola which is expressed in the equation:

$$x^2/a^2 - y^2/b^2 = 1, a>0, b>0$$

The other one is a parabola which can be expressed in the equation:

$$x^2 = 4cy, c>0$$

The circle is a particular form of the ellipse whose major and minor axes are equal with each other (a=b). The circle can be expressed in the equation:

$$x^2/a^2 + y^2/a^2 = 1.$$

In the above curves, the circle and the parabola contain only one parameter. Therefore these two curves are easy to handle in the case they are employed to form the cross sectional profile of the rolling groove because they have only one parameter to deal with instead of two in the other elliptical and hyperbolic curves. In view of the fact that a circular cross sectional profile is problematic in using with the rolling grooves as mentioned above; the parabolic profile is the only choice for present invention.

In proof of the innovative and technological content of the invention herein, refer to the detailed description of the invention and the accompanied brief description of the drawings appended below. Furthermore, the attached drawings are provided for purposes of reference and explanation, and shall not be construed as limitations applicable to the invention herein.

BRIEF DESCRIPTION OF THE DRAWINGS

The drawings disclose an illustrative embodiment of the present invention which serves to exemplify the various advantages and objects hereof, and are as follows:

FIG. 7 is a schematic view showing the cross section of a conventional rolling groove.

DETAILED DESCRIPTION OF THE PREFERRED EMBODIMENT

Figure 1:
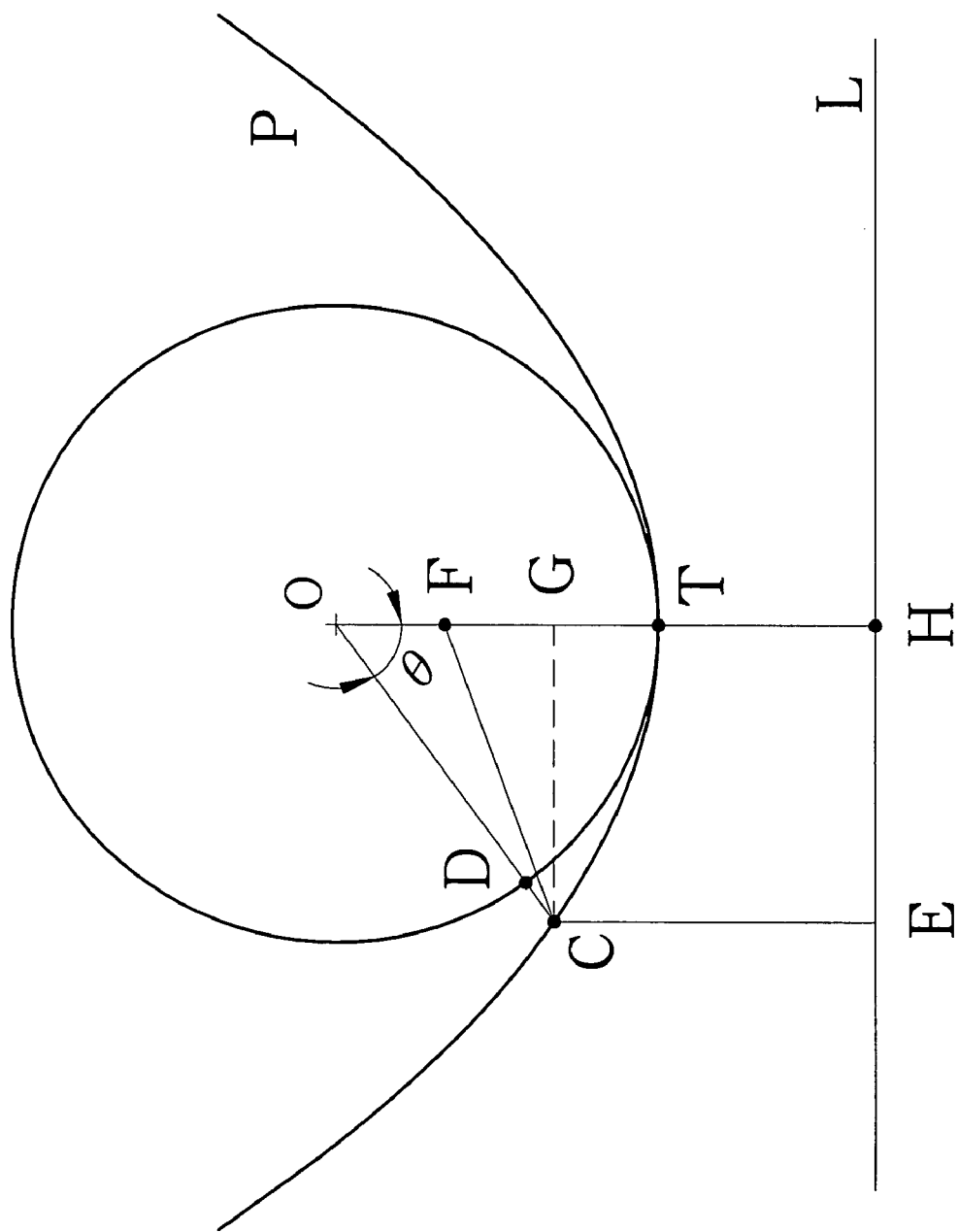
FIG. 1 is a parabolic cross sectional view of a rolling groove in the linear guide way of the present invention.

FIG. 1 shows a parabolic profiled cross section of the rolling groove in a linear guide way. As shown in FIG. 1, curve P is a parabola which forms a cross sectional profile of the rolling groove. Circle O is the profile of a ball whose radius is R. Point T, being the vertex of P is, the contact point with circle O. Center O and point T are connected with line OT, and OT=R. A line OC connects the center O and a point C on parabola P and intersects the circle O at point D forming an angle $\theta$ between OC and OT, where OD=R. Length of CD represents a clearance remained between the ball and the rolling groove. Here, for convenience, define CD=$\delta$. Suppose focus of parabola P is at F point, then F=FT is the focal length of parabola P. Now, define $\xi$=R/f, then OF=R−f, or OF=f($\xi$−1).

For figuring out the ratio of $\delta$ to R, at first, draw the directrix L for parabola P. Since the perpendicular distance form any point on parabola P to directrix L is equal to the distance from that point to focus F, hence CF=CE, and TF=TH=f. Now for calculating $\delta$(CD), draw an auxiliary line CG perpendicular to OT and intersects OT at point G, then $CF^2 = FG^2 + CG^2$, where $$CG = (f\xi + \delta) \cdot \sin\theta$$

$$FG = (f\xi + \delta) \cdot \cos\theta - f\xi + f$$

Since CF=CE=GH, hence $$CF = f\xi + f - (f\xi + \delta) \cdot \cos\theta$$

and a formula for $\delta/R$ in terms of $\theta$ and $\delta$ and $\xi$ will be derived as:

$$\delta/R = 2[\sqrt{(\cos^2\theta + \xi \cdot \sin^2\theta)} - \cos\theta]/\xi/\sin^2\theta - 1$$

Figure 2:
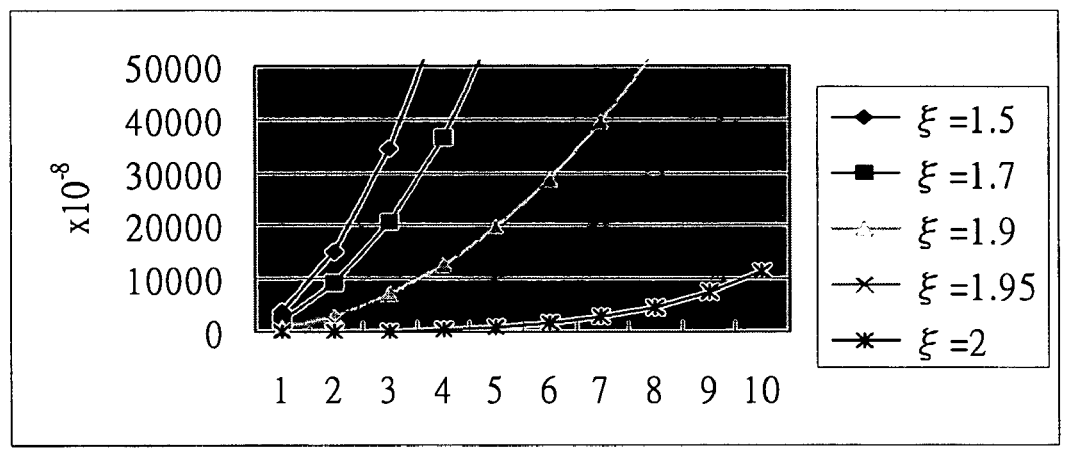
FIG. 2 is a group of graphs of $\theta$ vs $\delta/R$ plotted with respect to various coefficients of proportion $\xi$.

A group of graphs expressing the relation $\theta$ vs $\delta/R$ plotted for various coefficients of proportion is shown in FIG. 2, where $\theta$ is expressed on the abscissa axis in degree, while nondimensional ratio $\delta/R$ is expressed on the ordinate axis. It can be found on FIG. 2, if $\xi$=1.5(the leftist graph), and $\delta/R = 10^{-4}$, $\theta$ is approximately 1.6°; if $\xi$=1.7(second graph form the left side), and $\delta/R = 10^{-4}$, $\theta$ is approximately 2.2°, so it is as effective as that a conventional rolling groove with a simple arcuate cross sectional profile of $\eta$=0.56. If $\xi$=1.9, and $\delta/R = 10^{-4}$, $\theta$=3.5°, this value is slightly larger than the angle obtainable from a convention single arcuate profile having $\eta$=0.53. If $\xi$=1.95, and $\delta/R = 10^{-4}$, $\theta$=5°, this value is larger than the angle obtainable from a conventional single arcuate profile having $\eta$=0.52, or nearly approaches the angle obtainable from a conventional single arcuate profile having $\eta$=0.51. If $\xi$=2(at the rightest graph), and $\delta/R = 10^{-4}$, $\theta$ is approximately 9.6°, this value is larger than the angle obtainable from a conventional single arcuate profile having $\eta$ 0.51. Therefore, the ball can have the most optimistic contact angle with the rolling groove in the case the cross sectional profile of the rolling groove is formed into a parabola as recommended by the present invention. By doing so, the linear guide way can also work with an excellent loading ability as well.

Figure 3:
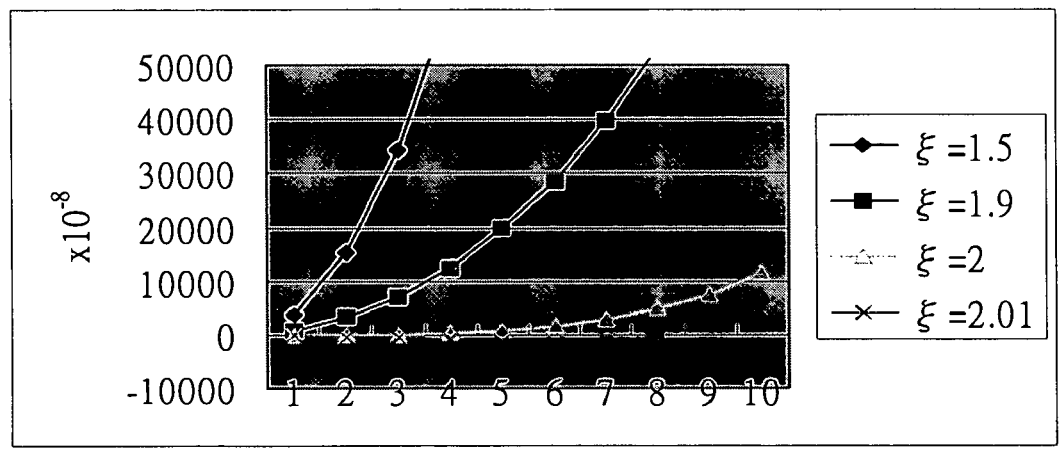
FIG. 3 is another group of graphs of $\theta$ vs $\delta/R$ plotted respectively with respect to various coefficients of proportion $\xi$.

Referring to FIG. 3, another group of $\theta$ vs $\delta/R$ plotted with respect to variously valued coefficients of proportion is shown. The cases when $\xi$=1.5, 1.9 and 2 are already illustrated as above. Herein; special emphasis will be put on the case when $\xi$>2, if $\delta$=2.01, by applying the above mentioned formula for calculation, it is found $\delta/R$<0, at $\theta$=1~8°. Its physical meaning is "The value of clearance between the ball 3 and the rolling groove is negative". Of course it is impossible to have a negative clearance, certain errors must have been introduced into the calculation. The fact is that when $\xi$=2.01, the ball contacts the groove at two points, each respectively at +6° and −6° (right and left apart from the lowest point in graph), but by no means comprehensively contacts with each other. As the load of the linear guide way gradually increases, the contact region between the ball and the groove will be enlarged too. In the example when $\xi$=2.01, after $\theta$>10°, the clearance between the ball and groove will also increase ($\delta/R$ is positive) that assists the ball and groove to refrain from abrupt change of their physical properties even the coefficient of proportion $\xi$ reaches its critical value 2. However, in the present invention, the cross sectional profile is characterizied in having excellent physical properties not only with a very large contact angle at $\xi=2$, but the contact range will never increase abruptly after $\xi$ exceeds 2.

Figure 4:
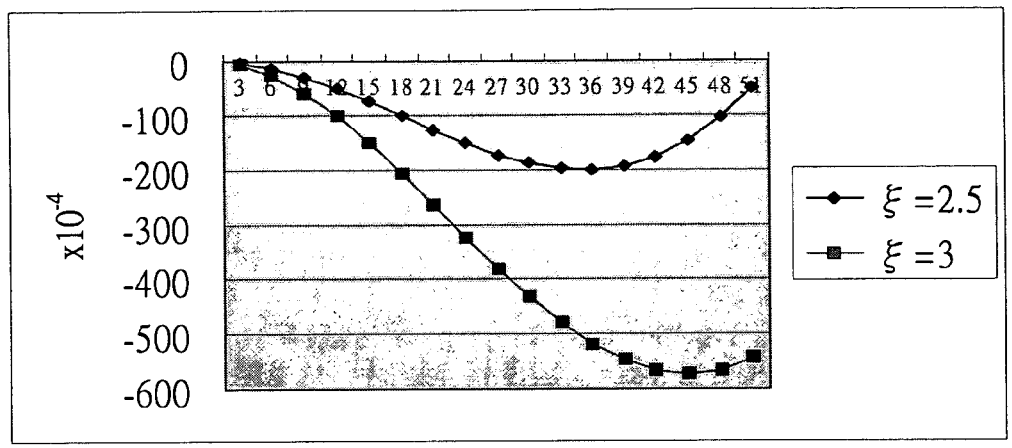
FIG. 4 are two graphs of $\theta$ vs $\delta/R$ plotted respectively with respect to the value of $\xi$ larger than 2 ($\delta$=2.5 and 3)
Figure 8:
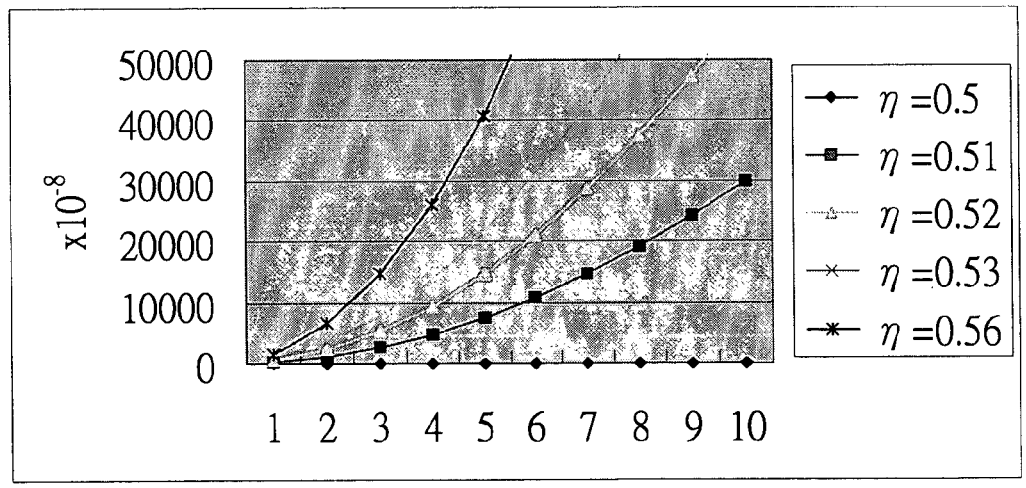
FIG. 8 is a group of $\theta$ vs $\delta/R$ graphs.

Two graphs of $\theta$ vs $\delta/R$ plotted respectively for $\xi>2$ are shown as in FIG. 4. According to FIG. 4, when $\xi=2.1$, the minimum value of $\xi/R$ exists at the point corresponding to $\theta=18°$ approximately, and the curvature of the graph is analogous to that $\xi=2$. Hence $\xi=2.1$ is considered to be a good parameter for design of load. When the coefficient of proportion $\xi=2.5$, the minimum value of $\delta/R$ exists at the point corresponding $\theta=36°$ approximately; while $\xi=3$, the minimum value of $\delta/R$ falls on the point $\theta=45°$ approximately. In general, the combined exerting force of the ball on the groove decreases when their contact angle increases. However, in the case $\theta=45°$ (the angle between two component forces is 90°), the applicable load is still admitted to reach 0.707 times of its original value. The contact angle for common Gothic profile is 45°, thus a contact angle of 45° when $\xi=3$ is within the allowable range for practical application.

Figure 5:
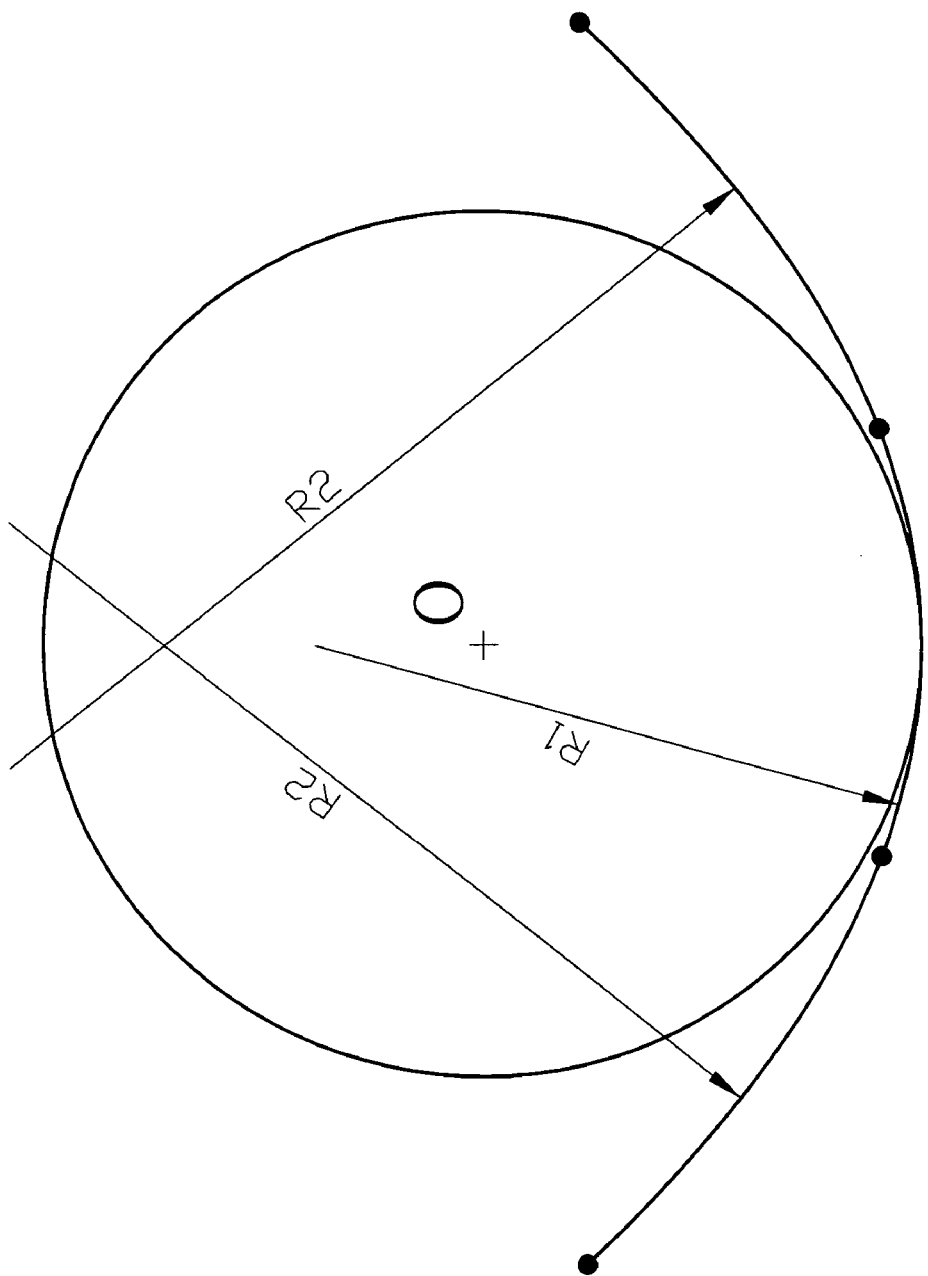
FIG. 5 is a view of a section of approximate parabolic curve formed by tangentially fitting three arcs to a circle.
Figure 6:
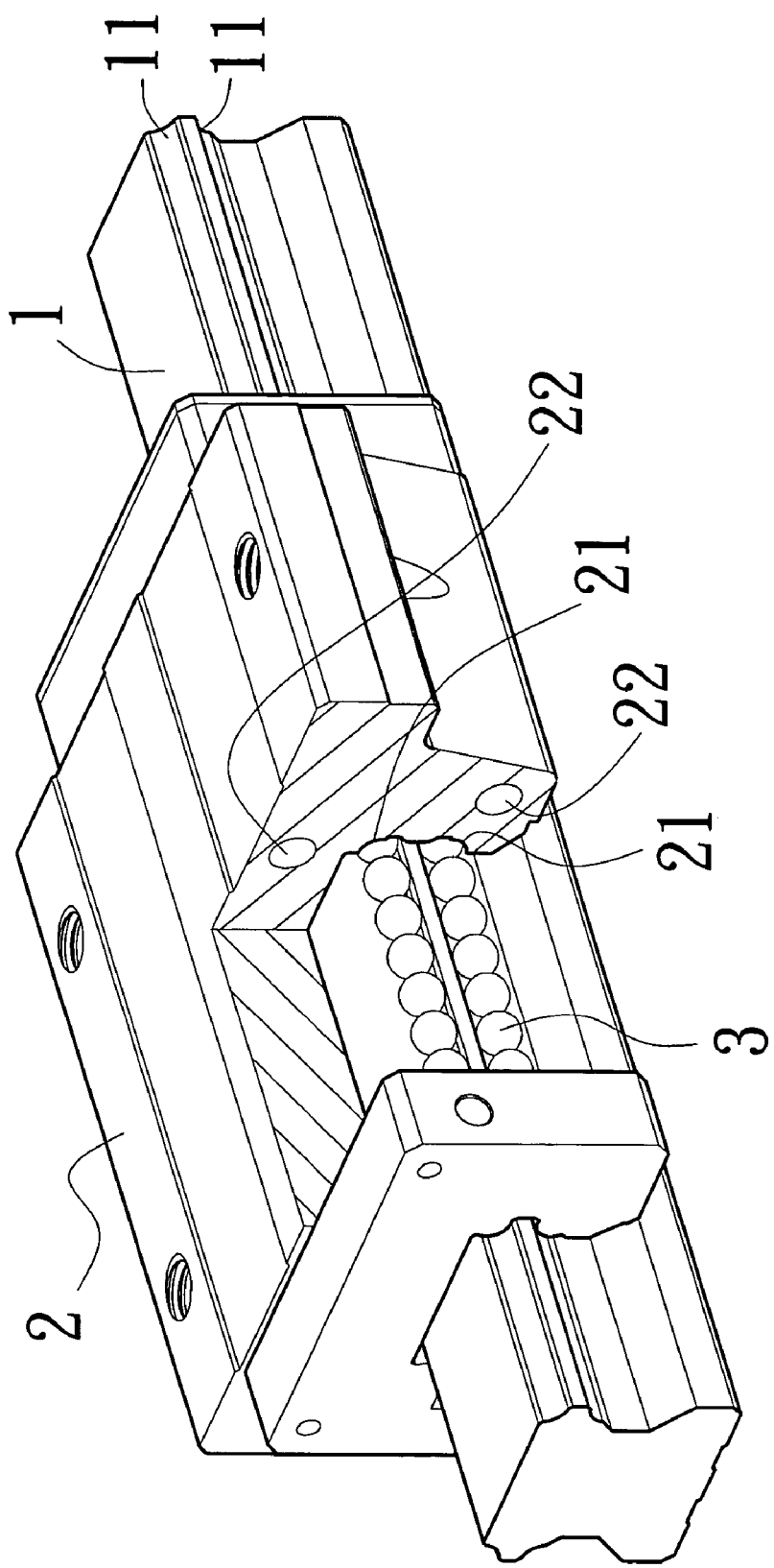
FIG. 6 is a perspective view of a conventional linear guide way.

A parabola is a plane curve symmetrically diverges in two side of its vertex. A parabolic profile can be obtained by substituting a series of numeral values into its formula. In the meanwhile the required parabolic profile can also be obtained by generating a point so moving that its distance form the focus being always equal to its distance from the directrix. Besides, as shown in FIG. 5, a parabolic profile can be drawn by the curve fitting technique in which a parabolic curve is approximated by three sections of tangent circle arcs. Since the parabola is symmetrical with respect to its vertex, the right and left half circle arcs must have a similar radius R2. Then select another circle arc of radius R1 to coincide with the former two circle arcs. Of course, continue to select as many the circle arcs as possible to fit the former portion, the more accurate parabola can be obtained.

In all, it is understood form the above description that the parabolic profiled cross section for the rolling groove disclosed by the present invention enables the linear guide way to avoid its balls to comprehensively contact the rolling grooves during operation such that the frictional loss therebetween can be reduced and the durability of the mechanical components can also be improved. Moreover, through properly controlling the coefficient of proportion $\xi$, the loading condition and ability of the linear guide way can be optimized and improved.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A linear guide way comprising:
   a rail-way having a rail-way groove provided in the lengthwise direction thereof;
   a slider set on said rail-way, being provided with a slider groove at the position corresponding to said rail-way groove; and
   a plurality of balls sandwiched between said rail-way groove and said slider groove to assist said slider to travel along the lengthwise direction with their rolling motion in said two grooves;
   wherein the cross sectional profile of at least one of said rail-way groove and said slider groove is configurated into a parabola.

2. The linear guide way as in claim 1, wherein said parabola is approximated by fitting a plurality of tangential arcs.

3. The linear guide way as in claim 1 or 2, wherein the radius of said ball is 1.5~3 times the focal length of said parabola.

4. The linear guide way as in claim 3, wherein the radius of said ball is 1.9~2.1 times the focal length of said parabola.

5. The linear guide way as in claim 1, wherein said ball contacts the cross sectional profile of said groove at a point proximate to the vertex of said parabola.

* * * * *